Patented July 12, 1938

2,123,599

UNITED STATES PATENT OFFICE 2,123,599

PRODUCTION OF POLYMERIZATION PRODUCTS

Hans Fikentscher and Claus Heuck, Ludwigshafen-on-the-Rhine, Germany, assignors to I. G. Farbenindustrie Aktiengesellschaft, Frankfort-on-the-Main, Germany No Drawing. Application January 17, 1931, Serial No. 509,532. In Germany January 28, 1930

13 Claims. (Cl. 260—2)

The present invention relates to the production of polymerization products and articles therefrom.

We have found that the polymerization of water-insoluble carboxyl derivatives of acrylic acid and its homologues such as acrylic methyl, ethyl or amyl or aromatic esters, acrylic nitrile, acrylic anilide or α-methylacrylic butyl ester, is advantageously carried out by emulsifying the said substances as such, or in admixture with each other or with other substances, in liquids in which the said initial materials are practically insoluble, such as water or aqueous liquids, and then polymerizing them. In this manner from latex-like liquids to solid products are obtained, the latex-like liquids yielding very valuable products of great purity, those obtained from acrylic esters resembling first quality India rubber when coagulated.

The emulsions are preferably prepared with the aid of emulsifying agents such as Marseilles soap, ammonium oleate or Turkey red oil, or emulsifying wetting agents, i. e. true sulphonic acid salts, such as alkylated naphthalene sulphonic salts or palmitic sulphonic salts, or both emulsifying and wetting agents.

The thinly liquid emulsions may be obtained in a stable form even by shaking, but they may also be prepared in suitable emulsifying apparatus, as for example homogenizers. In this form they are extremely stable to the saponifying actions of the water. The polymerization, which may be carried out by known methods either in the cold or while heating to any temperatures up to the boiling point of water, or in a closed vessel, somewhat above the boiling point of water and at a few atmospheres above atmospheric pressure, say at 2, 3 or about 5 atmospheres may be accelerated by irradiation with artificial or natural sources of light and/or by the employment of polymerizing agents such as hydrogen peroxide, ozone, benzoyl peroxide, sodium para-toluene sulphonic chloramide and the like, depending on the nature of the starting materials, the acrylic esters being usually more easily polymerized than the nitrile, the polymerization of which latter is preferably carried out at from 60° to 80° C. in the presence of a peroxide.

Valuable mixed polymerization products are obtained by polymerizing the said initial materials in the emulsified form in admixture with each other or with other organic substances capable of forming films, or at least capable of forming film-forming polymers, such as vinyl acetate, vinyl chloride or styrene which apparently also accelerate the polymerization of the acrylic derivatives. Thus acrylic nitrile, acrylic amides or their derivatives, aliphatic or aromatic esters of acrylic acid may be polymerized in any desired mixtures and/or in conjunction with vinyl acetate or chloride, with styrene and so on, the number of possible variations being extremely high owing to the possibility of employing any desired concentration of the ingredients preferably while employing preponderating, or at least equal quantities of acrylic derivatives; especially styrene, which is capable of forming hard polymers, is employed in quantities lower than those of the water-insoluble acrylic derivatives employed. Valuable masses are also obtained by adding organic film-forming substances which are not themselves polymerizable, as for example cellulose derivatives, India or like vegetable rubber, artificial resins as for example para-toluene sulphonamide formaldehyde resins, polymerized styrenes or polymerized vinyl acetate and the like, or softening agents such as camphor, phenols, phthalic esters, phosphoric esters, derivatives of urea or like known plasticizers, before, during or after the polymerization, the cellulose derivatives, rubber or polymerized substances being preferably dissolved in the acrylic derivatives before the emulsification if the said additions be made before or during the polymerization. For the sake of brevity the said additional substances will be comprised in the following and in the claims by the term "organic film-forming substances".

A particularly efficient method of polymerization is carried out in such a manner that the said acrylic acid derivatives or their homologues, either alone or in admixture with each other or with other substances which may be polymerizable, are slowly introduced, as for example by spraying them in fine jets or allowing them to run or drop in, into aqueous solutions of emulsifying and/or wetting agents while vigorously stirring or whirling and while heating and/or irradiating. The speed with which the materials to be polymerized are introduced depends on the nature of the substances or mixtures to be polymerized, on the temperature of the solution, on the intensity of the irradiation and on the nature of the emulsifying agents and wetting agents. It may be increased by the addition of polymerization accelerators, as for example hydrogen peroxide, benzoyl peroxide and the like. The polymerizing agent may be added to the aqueous solution or to the substance to be polymerized or to both. The final polymerization products

Example 5

100 parts of acrylic ethyl ester are emulsified in 200 parts of water to which 0.3 per cent of Marseilles soap and 0.5 per cent of sodium iso-butylnaphthalene sulphonate have been added as emulsifying agents. After the addition of 1 part of 30 per cent hydrogen peroxide the emulsion is irradiated with ultraviolet light from a mercury vapour lamp for 2 hours. After this period of time the non-polymerized acrylic acid ester is completely polymerized. The polymerization product may be precipitated from the dispersion by coagulation in a simple manner by means of dilute acids, as for example aqueous hydrochloric acid.

Example 6

20 parts of nitrocellulose are dissolved in 80 parts of acrylic ethyl ester and emulsified in 200 parts of water which contain 0.3 per cent of Marseilles soap and 0.5 per cent of sodium iso-propylnaphthalene sulphonate and which has ben adjusted with the aid of N/100 aqueous sulphuric acid to a hydrogen ion concentration corresponding to a pH value of 6.2. 2.5 parts of 30 per cent aqueous hydrogen peroxide are added to the emulsion. After heating for 2 hours at from 80° to 90° C., the dispersion is freed from any non-polymerized ester with the aid of steam, and coagulated with the aid of aqueous 5 per cent hydrochloric acid. The product is readily soluble in organic solvents and yields very elastic films.

Example 7

100 parts of α-methyl acrylic butyl ester in which 0.75 part of benzoyl peroxide has been dissolved are emulsified in a solution of 1.5 parts of Turkey red oil and 0.75 part of the sodium salt of iso-butyl naphthalene sulphonic acid in 300 parts of water. The emulsion is then heated under reflux, while stirring, to from 80° to 95° C. for from 2 to 5 hours. By treating the polymerization product with steam, the last traces of the monomeric acrylic esters are removed and the polymerization product can be coagulated with the formation of a product resembling raw rubber by the addition of 3 parts of concentrated hydrochloric acid.

Example 8

100 parts of (monomeric) acrylic nitrile are emulsified in an aqueous solution of 0.5 part of the sodium salt of palmitic sulphonic acid and 0.6 part of Marseilles soap in 200 parts of water. The emulsion obtained is incorporated with 3 parts of aqueous 30 per cent hydrogen peroxide and then heated in a stirring vessel provided with a reflux condenser for from 2 to 5 hours at the start to from 70° to 80° C. and finally to 90° C. The polymerization product formed is mainly precipitated during the polymerization in the form of a white powder and small lumps and is freed from the last traces of monomeric acrylic nitrile by introducing steam after the polymerization has been finished. The polymerization product can be moulded by pressing into artificial masses of high insulating power and stability against water.

Example 9

0.75 part of benzoyl peroxide is dissolved in a mixture of 20 parts of (monomeric) acrylic nitrile and 80 parts of (monomeric) acrylic ethyl ester which solution is then converted into a milky emulsion by shaking it with a solution of 1 part of Turkey red oil and 0.5 part of the sodium salt of iso-butyl naphthalene sulphonic acid. By heating the emulsion for from 2 to 5 hours from 70° to 90° C., a mixed polymerization product of the nitrile and of the ester is obtained some portion of the polymerization product being already precipitated in the coagulated form. In order to complete the coagulation 2 parts of concentrated hydrochloric acid are added, whereby a product is obtained which resembles in some degree raw rubber the hardness of which product, however, is greater than that of a polymerization product from pure acrylic ethyl ester; the product obtained is soluble in acetone, cyclohexanone and other organic solvents and furnishes transparent soft films which may be employed as an adhesive in the production of compound glass from several glass plates.

Example 10

0.75 part of benzoyl peroxide is dissolved in a mixture of 90 parts of (monomeric) acrylic nitrile and 10 parts of (monomeric) acrylic methyl ester, whereupon the solution is emulsified in a solution of 1 part of Turkey red oil and 0.5 part of the sodium salt of di-iso butyl naphthalene sulphonic acid in 200 parts of water; the emulsion is then heated for 4 hours at from 70° to 90° C., whereby a complete polymerization is attained and the product is then coagulated by adding at room temperature 3 parts of concentrated hydrochloric acid. The hard product obtained dissolves only in concentrated acids, for example in phosphoric acid, with simultaneous saponification and is suitable for the production of artificial masses by pressing, the articles obtained possessing a high insulating power and a good resistance to bending.

Example 11

0.5 part of benzoyl peroxide is dissolved in a mixture of 60 parts of (monomeric) acrylic nitrile and of 40 parts of (monomeric) vinyl acetate, the solution is then emulsified in a solution of 1 part of Turkey red oil and 0.5 part of the sodium salt of iso-butyl naphthalene sulphonic acid in 200 parts of water. By heating the emulsion, while stirring, for 5 hours at from 70° to 90° C. under reflux, a polymerization product is obtained which, after treatment with steam, constitutes a hard elastic mass.

Example 12

40 parts of (monomeric) acrylic nitrile and 60 parts of (monomeric) styrene are emulsified in a solution of 1 part of Turkey red oil and 0.5 part of the sodium salt of iso-butyl naphthalene sulphonic acid in 200 parts of water; 3 parts of aqueous 30 per cent solution of hydrogen peroxide are then added and the polymerization is performed by heating for 2½ hours at from 70° to 90° C. The mixed polymerization product is precipitated during the polymerization as a soft mass which becomes hard on cooling to room temperature.

Example 13

A mixture of 60 parts of (monomeric) acrylic nitrile, 30 parts of (monomeric) acrylic methyl ester and 10 parts of styrene is emulsified in a solution of 1.5 parts of Turkey red oil and 0.75 part of the sodium salt of butyl naphthalene sulphonic acid in 300 parts of water. The emulsion is then heated in a pressure tight stirring vessel for 1 hour to from 100° to 110° C., whereby a liquid resembling rubber latex is obtained which is converted into a hard but elastic product by adding 5 parts of hydrochloric acid. Artificial threads may be obtained from the said product by spinning a solution of the coagulated product in acetone through spinning nozzles in the manner usually applied in the production of artificial silk and the like from cellulose esters by the air spinning process.

Example 14

A mixture of 50 parts of (monomeric) acrylic ethyl ester and of 50 parts of a 70 per cent solution of (monomeric) acrylic acid is emulsified in a solution of 0.15 part of Marseilles soap, 0.5 part of triethanol amine mono oleic ester and 2.5 parts of 30 per cent aqueous hydrogen peroxide in 150 parts of water, and the emulsion is then heated for 2 hours at from 75° to 90° C. After treating the polymerization product obtained with steam a hard elastic mass is obtained.

Example 15

5 parts of the polymeric soluble acrylic methyl ester and 5 parts of nitrocellulose are dissolved in a mixture of 25 parts of ethyl acetate, 15 parts of methyl acetate and 10 parts of methanol; the solution is worked into films in any suitable manner as usually applied for the manufacture of films from nitrocellulose. The films obtained possess a high tensile strength and a higher stability to frequent bending, a higher elasticity and a lower inflammability than films from nitrocellulose solely.

Example 16

A 16 per cent solution in acetone of equal parts of polymeric acrylic ethyl ester and of a nitrocellulose employed for the production of films is spun through a tower of about 1.2 metres height, heated to 85° C. through spinning nozzles at a pressure of 8 atmospheres and a velocity of drawing off the threads at 137 metres per minute. Threads of 1.6 denier with a good strength and tensile elasticity are obtained. The finished threads can be denitrated in the manner usually applied in the denitration of nitrocellulose threads and they are superior to threads from viscose as regards elasticity and strength on frequent bending.

Example 17

40 parts of acrylic nitrile and 60 parts of acrylic methyl ester are mixed with 20 parts of camphor, 0.2 part of benzoyl peroxide, and the whole is emulsified in a solution of 2 parts of Turkey red oil, 1 part of iso-butyl naphthalene sulphonic acid sodium salt and 2 parts of an aqueous 30 per cent solution of hydrogen peroxide in 400 parts of water.

The emulsion is then heated in a closed vessel to from 90° to 95° C. and the polymerization is completed after from 15 to 30 minutes, a latex-like product containing small quantities of solid matter being obtained. By adding 2 parts of concentrated hydrochloric acid coagulation takes place. The final product is a thermoplastic mass which is hard in the cold state and can be easily pressure moulded worked with metal tools or blown into moulds like celluloid. In the place of camphor phenol, tricresyl phosphate, di-butyl phthalate or diphenyl, dimethyl urea may be employed.

Example 18

A solution of 2 parts of sodium iso-butyl naphthalene sulphonate, 4 parts of Turkey red oil and 12 parts of 30 per cent aqueous hydrogen peroxide in 400 parts of water is heated to from 90° to 95° C. in a vessel provided with a reflux condenser. 100 parts of monomeric acrylic nitrile are allowed to drop in slowly while stirring vigorously. The temperature thereby falls to from 70° to 75° C. at the beginning and must be raised to 95° C. again towards the end. The polymerization product is precipitated in a finely granular form, a white pulp being formed. Any non-polymerized nitrile can be removed therefrom by treatment with steam and the pure polymerization product is isolated by filtration by suction.

Example 19

A solution of 2 parts of sodium iso-butyl naphthalene sulphonate and 2 parts of Turkey red oil in 300 parts of water is heated to 90° C. While stirring vigorously, 100 parts of monomeric acrylic nitrile containing 1 part of benzoyl peroxide are sprayed in in fine jets. The temperature falls to from 70° to 75° C. at first and rises again to 95° C. towards the end. The polymerization product formed is precipitated as a fine-grained powder.

Example 20

A solution of 0.3 part of sodium oleate, 1 part of triethanolamine mono-oleic ester and 3 parts of 30 per cent hydrogen peroxide in 400 parts of water is heated to from 85° C. to 95° C. in a vessel provided with a reflux condenser. 100 parts of pure monomeric acrylic ethyl ester are allowed to drop slowly into the mixture while stirring. The temperture falls to from 75° to 80° C. and rises again to 90° C. towards the end. The polymerization product largely remains emulsified like rubber latex and is precipitated by treatment with steam as a rubber-like mass which forms very viscous solutions when dissolved in organic solvents, as for example benzene, acetone or butyl acetate.

Example 21

A solution of 0.6 part of Marseilles soap and 2 parts of Turkey red oil in 400 parts of water is heated to 90° C. and 100 parts of pure monomeric alpha-methyl-acrylic butyl ester containing 1 part of benzoyl peroxide dissolved therein are allowed to drop in while stirring. After the temperature has fallen at the start to about 80° C. it rises again to 90° C. towards the end. The polymerization product which is immediately formed is freed from the last traces of monomeric ester by vigorously boiling the dispersion and is then wholly coagulated by the addition of 4 parts of concentrated hydrochloric acid.

Example 22

A mixture of 50 parts of acrylic methyl ester, 50 parts of acrylic ethyl ester and 1 part of acetic anhydride is sprayed in fine jets into a vessel provided with a reflux-condenser and containing a solution of 0.6 part of Marseilles soap, 2 parts of Turkey red oil and 3 parts of 30 per cent hydrogen peroxide in 300 parts of water which is at first heated to from 75° to 80° C. and towards the end to 90° C. The polymerization takes place very rapidly during the spraying. The polymerization product remains largely emulsified like rubber latex and may be completely coagulated to a rubber-like mass soluble in organic solvents by blowing with steam or, more rapidly, by the addition of 5 parts of concentrated sulphuric acid.

Example 23

A solution of 1 part of Turkey red oil, 0.5 part of sodium iso-propyl naphthalene sulphonate and 2 parts of 30 per cent hydrogen peroxide in 200 parts of water is heated to from 85° to 90° C. A mixture of 60 parts of monomeric acrylic nitrile, 30 parts of monomeric acrylic ethyl ester and 10 parts of monomeric vinyl acetate is slowly introduced while stirring. The temperature falls at the beginning to from 70° to 75° C. but rises to 90° C. again towards the end. The polymerization product which is precipitated in a granular form is purified by treatment with steam. It is soluble in some organic solvents, as for example acetone, to give clear solutions.

*Example 24*

A solution of 0.5 part of sodium iso-butyl naphthalene sulphonate and 1 part of Turkey red oil in 200 parts of water is heated to 90° C. and 95 parts of monomeric acrylic nitrile containing 5 parts of chlor-ethyl-tri-phosphoric ester and 0.5 part of benzoyl peroxide are gradually introduced, while stirring vigorously. The temperature falls to from 70° to 75° C. and must be raised to 90° C. towards the end. The polymerization product formed is treated with steam. It is a white powdery mass.

*Example 25*

A solution of 0.25 part of the sulphuric ester of octodecyl alcohol, 0.5 part of Turkey red oil and 2 parts of 30 per cent hydrogen peroxide in 100 parts of water is heated to from 80° to 90° C. and a mixture of 50 parts of acrylic nitrile, 50 parts of a 72 per cent aqueous acrylic acid and 1 part of acetic anhydride is slowly added. The reaction temperature is initially 76° C. and must be raised to 95° C. towards the end. The polymerization product formed is soluble in alkalies giving very viscous solutions.

*Example 26*

A solution of 0.15 part of Marseilles soap and 0.5 part of Turkey red oil in 100 parts of water is placed into a glass vessel which is exposed to bright sunlight. 100 parts of acrylic ethyl ester containing 1 part of acetic anhydride and 0.3 part of benzoyl peroxide are allowed to flow slowly from a vessel protected from the light into the glass vessel while stirring and the glass vessel is irradiated by the sunlight until the polymerization is completed. The polymerization is completed after several hours or after from 1 to 2 days depending on the intensity of the light. The insolubility of the polymerization product in organic solvents, such as acetone and butyl acetate, is a sign of the high degree of polymerization of this product prepared in sunlight.

What we claim is:—

1. In the production of polymerization products and articles therefrom by polymerization of a mixture of a water-insoluble carboxyl derivative of acrylic acid and its homologues selected from the group consisting of esters and nitriles of said acid with another organic film-forming substance, the step which comprises subjecting to polymerization an emulsion of such derivative in a liquid in which the said initial material is practically insoluble.

2. In the production of polymerization products and articles therefrom by polymerization of a mixture of different carboxyl derivatives of the acrylic acid and its homologues selected from the group consisting of esters and nitriles of said acid, the step which comprises subjecting to polymerization an emulsion of the said mixture in a liquid in which the said initial materials are practically insoluble.

3. The process which comprises emulsifying an ester of methacrylic acid and then polymerizing said ester.

4. A process which comprises emulsifying a mixture of an ester of acrylic acid with an ester of methacrylic acid and then polymerizing the mixture.

5. A coating composition for leather containing a polymerized ester of methacrylic acid.

6. A plasticized composition comprising a polymerized methacrylic acid ester and a softening agent.

7. A composition of matter comprising a polymerized ester of methacrylic acid and polymerized styrene.

8. A plastic composition comprising an organic plastic substance and a polymerized ester of methacrylic acid.

9. An organic plastic substance comprising a polymerized ester of methacrylic acid and a cellulose derivative.

10. An organic plastic substance comprising a polymerized ester of acrylic acid and a cellulose derivative.

11. An organic plastic substance comprising a polymerized ester of acrylic acid and nitrocellulose.

12. An organic plastic substance comprising a polymerized ester of acrylic acid and another synthetic resin.

13. A composition of matter comprising polymerized acrylic acid and a polymerized ester of acrylic acid.

HANS FIKENTSCHER.
CLAUS HEUCK.